(12) United States Patent
Covey et al.

(10) Patent No.: US 8,117,642 B2
(45) Date of Patent: Feb. 14, 2012

(54) COMPUTING DEVICE WITH ENTRY AUTHENTICATION INTO TRUSTED EXECUTION ENVIRONMENT AND METHOD THEREFOR

(75) Inventors: Carlin R. Covey, Tempe, AZ (US);
Ronald B. Harvey, Mesa, AZ (US);
Mark D. Redman, Gilbert, AZ (US);
Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 999 days.

(21) Appl. No.: 12/053,502

(22) Filed: Mar. 21, 2008

(65) Prior Publication Data

US 2009/0240923 A1 Sep. 24, 2009

(51) Int. Cl.
*G06F 7/04* (2006.01)
*G06F 11/30* (2006.01)
(52) U.S. Cl. ........................................ 726/2; 713/189
(58) Field of Classification Search ....... 726/2; 713/189
See application file for complete search history.

(56) References Cited

U.S. PATENT DOCUMENTS

| | | | |
|---|---|---|---|
| 6,226,749 B1* | 5/2001 | Carloganu et al. | 726/2 |
| 6,978,018 B2 | 12/2005 | Zimmer | |
| 7,020,772 B2 | 3/2006 | England et al. | |
| 7,120,771 B2 | 10/2006 | Dahan et al. | |
| 7,210,009 B2 | 4/2007 | Gulick et al. | |
| 7,370,210 B2* | 5/2008 | Symes | 713/189 |
| 7,401,358 B1* | 7/2008 | Christie et al. | 726/21 |
| 7,454,787 B2* | 11/2008 | Hyser | 726/16 |
| 2003/0126454 A1* | 7/2003 | Glew et al. | 713/193 |
| 2003/0140245 A1* | 7/2003 | Dahan et al. | 713/200 |
| 2003/0226031 A1* | 12/2003 | Proudler et al. | 713/200 |
| 2004/0003273 A1* | 1/2004 | Grawrock et al. | 713/193 |
| 2004/0177269 A1* | 9/2004 | Belnet et al. | 713/200 |
| 2005/0165783 A1* | 7/2005 | Hyser | 707/9 |
| 2006/0090084 A1* | 4/2006 | Buer | 713/189 |
| 2006/0123416 A1* | 6/2006 | Cibrario Bertolotti et al. | 718/1 |
| 2006/0259764 A1* | 11/2006 | Asal et al. | 713/166 |
| 2007/0106986 A1* | 5/2007 | Worley, Jr. | 718/1 |
| 2008/0282084 A1* | 11/2008 | Hatakeyama | 713/155 |
| 2009/0083858 A1* | 3/2009 | Jennings et al. | 726/27 |

* cited by examiner

*Primary Examiner* — Techane Gergiso
(74) *Attorney, Agent, or Firm* — Meschkow & Gresham, P.L.C.

(57) ABSTRACT

A computing device (10) includes a trusted execution environment (TEE) manager (40) that manages a switchover from non-trusted software (116) to trusted software (118). The TEE manager (40) includes memory (90) configured to store password-bearing, immediate-operand instructions (54). At the point of switching between the non-trusted software (116) and the trusted software (118) the memory (90) may be accessed as instruction fetches, and its contents fetched into a CPU core (24) as instructions. Immediate-operand portions (60) of the immediate-operand instructions (54) provide passwords, which are written back into guess registers (80) within the TEE manager (40). When a predetermined relationship between the instructions (54) and guesses in guess registers (80) is identified, actual execution of the immediate-operand instructions (54) is verified, the TEE mode of operation is signaled, and security-sensitive hardware (44) is enabled for use by a privileged routine (42) portion of the trusted software (118).

17 Claims, 6 Drawing Sheets

COMPUTING DEVICE WITH ENTRY AUTHENTICATION INTO TRUSTED EXECUTION ENVIRONMENT AND METHOD THEREFOR

TECHNICAL FIELD OF THE INVENTION

The present invention generally relates to data security in electronic devices. More specifically, the present invention relates to the implementation of a trusted execution environment (TEE) having an improved mechanism for switching into the TEE.

BACKGROUND OF THE INVENTION

A computing device is an electronic apparatus, whether a portion of a single integrated circuit or an entire system, whose functions and operations are defined by both hardware and software. Hardware represents the physical components that carry out the functions of the device, and software represents the collection of all programming instructions, procedures, rules, routines, modules, programs, data, and the like that define how to carry out the device's functions and operations.

Manufacturers of computing devices intended for specific system applications are often concerned about the security of at least some of the computing device's data and functions. Thus, some system applications may employ security-sensitive cryptographic circuits so that security policies may be implemented with respect to data handled by the device. Some system applications may employ other security-sensitive circuits, such as RF transmitters whose use is tightly controlled for regulatory and network efficiency purposes, and security policies may be implemented so that the security-sensitive circuits are not misused.

Two classes of software are often identified for the purposes of implementing a security policy. One class is non-trusted software. Non-trusted software may or may not be malicious, but no assurance is provided that the non-trusted software will cause no harm. In many situations, non-trusted software may nevertheless be beneficial to a user of the computing device. Thus, a computing device often permits the execution of non-trusted software. But in accordance with a security policy, non-trusted software executes in a non-privileged mode of operation, or restricted execution environment (REE), in which access is denied to security-sensitive resources so that the non-trusted software cannot cause harm.

Trusted software is software whose bone fides are assured. If trusted software controls security-sensitive resources, it does so in a way that causes no harm. When security-sensitive resources are controlled by trusted software, the computing device may operate in a privileged mode, or trusted execution environment (TEE), that allows the trusted software to access the resources needed to carry out its function. A TEE is where trusted software has control of the CPU and the device. In this environment access is allowed to security sensitive resources.

System designers of computing devices face many challenges in configuring a computing device to provide both an REE and a TEE. While in the REE, the non-trusted software's access to security-sensitive resources should be constrained. Then, before switching to the TEE, an entry mechanism should authenticate the trusted software to establish that the software about to be executed is authentic trusted software and not malicious, mischievous, or possibly error-infested software. And, the entry mechanism itself, which provides an interface between the REE and TEE, should be protected against threats.

Conventional techniques for implementing both an REE and TEE are inadequate. A variety of different manufacturers provide different versions of CPU cores and operating systems. CPU cores represent central processing units (CPUs) and related circuits dedicated to controlling the flow of instructions and data into and out of the CPU, and operating systems represent the software that interfaces most directly with hardware and that controls the execution of application software. These manufacturers provide some products with some features directed toward distinguishing between privileged and non-privileged modes of operation. But from a system perspective, a solution that is unique to a specific CPU core or a specific operating system is highly undesirable because it enslaves other system components and the entire system design to a specific CPU core and/or operating system.

Moreover, many of the conventional techniques are simply ineffective from a system perspective. For example, features built into a CPU core often do not extend outside the CPU core where they might have been useful for controlling other system components. And, whether or not such features are extended outside a CPU core, other active entities in the system, such as direct memory access (DMA) devices or other CPU's, often cannot be controlled with respect to implementing an effective TEE. Operating systems may have been written so that too much potentially flawed software runs in privileged modes, thereby blurring the distinction between the TEE and the REE. Too many techniques are vulnerable to being tricked by stack and cache manipulations, by conditional branching, speculative execution, and out-of-order instruction completion schemes, and by failing to verify that trusted software actually executes. As a consequence, the conventional techniques provide inadequate security assurances, particularly from a system-wide perspective.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
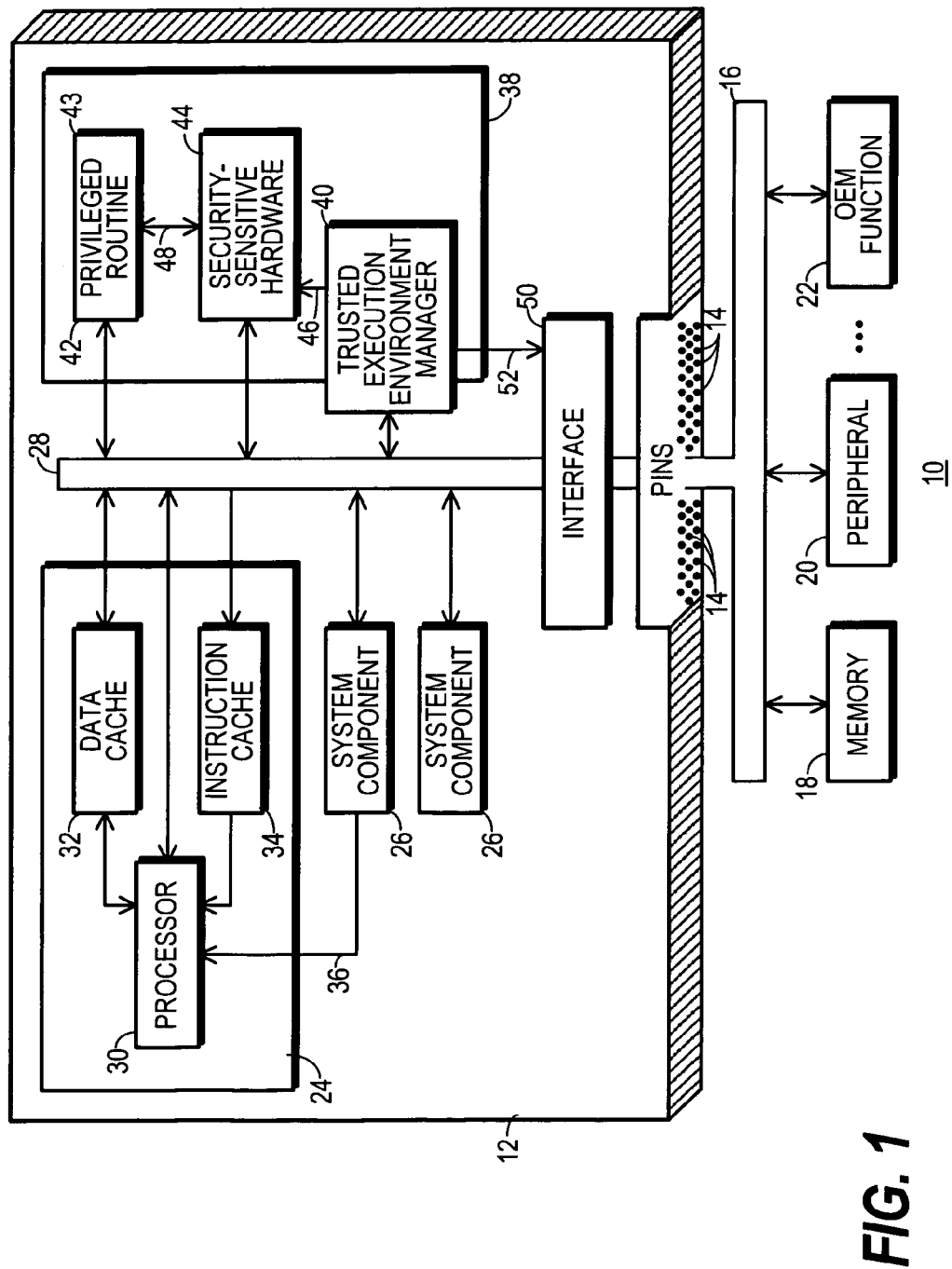
FIG. 1 shows a simplified block diagram of a computing device configured in accordance with one embodiment of the present invention.

FIG. 1 shows a simplified block diagram of a computing device 10 configured in accordance with one embodiment of the present invention. Computing device 10 may be configured for any of a wide variety of data-processing applications, including point-of-sale terminal, wireline or wireless telephone, radio, personal computer, laptop, handheld computer, workstation, digital media player, router, modem, industrial controller, and the like. Regardless of a specific configuration, the security of at least some of the data and/or functions of computing device 10 is a concern.

In a preferred embodiment, computing device 10 is an electronic device formed using one or more semiconductor devices 12 which have pins 14 through which signals are routed into and out of device 12. Semiconductor device 12 couples to other units and components through an external bus 16. The other units and components may include memory 18, peripherals 20, and original equipment manufacturer (OEM) functions 22. Memory 18 may be configured as magnetic, optical, or semiconductor memory and may be configured as volatile and/or non-volatile memory. Peripherals 20 represent devices which support the primary operations of computing device 10. In one example, peripherals 20 may include any of a wide variety of data input and data output devices known to those skilled in the art. OEM functions 22 represent devices added by a manufacturer other than the manufacturer of semiconductor device 12 or the provider of any operating system that may run on semiconductor device 12 and that tailor computing device 10 to a particular application.

Within semiconductor device 12, a central processing unit (CPU) core 24 and a variety of system components 26 couple together through an internal bus 28. CPU core 24 includes a processor 30 and a variety of circuits which support processor 30 and are dedicated to controlling the flow of instructions and data into and out of processor 30. Processor 30 may also be called an arithmetic unit, a central processing unit, microprocessor, controller, digital signal processor, and the like. Supporting circuits may include a data cache 32, an instruction cache 34, and other circuits (not shown) known to those skilled in the art. Nothing requires CPU core 24 to include caching circuits 32 and 34, or that separate caching circuits 32 and 34 be included for data and instructions.

System components 26 may also couple to internal bus 28 and be configured in accordance with a wide variety of circuits known to those skilled in the art of computing devices. Volatile or non-volatile memory, direct memory access controllers, other processors, and serial or parallel data link controllers are but a few of the many possible circuits that may serve as system components 26.

Processor 30 may occasionally execute software stored in some of system components 26. From the prospective of computing device 10, such software will most likely be considered non-trusted software. But if adequate authentication is provided trusted software may reside in any system component, including system components 26. Processor 30 may be configured to respond to interrupts 36, and some of system components 26 may couple to processor 30 through the use of interrupts 36. Those skilled in the art will appreciate that interrupts are one technique for forcing a processor to stop executing one routine and then execute another routine that services the interrupt, but that interrupts may be disabled or otherwise secured to tightly control the precise instructions that processor 30 executes.

Computing device 10 includes a trusted portion 38 having circuits that couple to internal bus 28. In trusted portion 38, data integrity is assured by any of a variety of hardware, software, firmware, and/or physical access techniques known to those skilled in the art of providing security for computing devices. To a desired degree of confidence, the designed condition of the data within trusted portion 38 remains sound, unimpaired, and unmolested. Some data within trusted portion 38 may be discoverable by non-trusted software, but unalterable by the non-trusted software. Alternatively, some data within trusted section 38 may be completely undiscoverable by non-trusted software.

Those portions of computing device 10 outside of trusted portion 38 are generally viewed by the software within trusted portion 38 as being a non-trusted portion of computing device 10. In contrast to trusted portion 38, the software within trusted portion 38 does not assume that data in the non-trusted portion have any particular bone fides, authenticity, or legitimacy. The non-trusted portion has data that can be both altered and discovered by non-trusted software. But those skilled in the art will appreciate that a physical location in a processor's address space may be non-trusted in one situation (not operating in a privileged mode) and trusted in another (operating in a privileged mode). Likewise, CPU core 24 may be viewed as being non-trusted when under or potentially under the control of non-trusted software, but trusted when under the control of trusted software.

Trusted section 38 includes a trusted execution environment (TEE) manager 40. TEE manager 40 allows computing device 10 to switch from operating in a restricted execution environment (REE) to operating in the TEE. When operating in the REE, computing device 10, including non-trusted software executing on processor 30, operates in a non-privileged mode and cannot access or manipulate portions of computing device 10 considered to have a security sensitivity, but can otherwise function normally. When operating in the TEE, computing device 10, including trusted software executing on processor 30, operates in a privileged mode and can access portions of computing device 10 that have a security sensitivity as well as those portions of computing device 10 that have no particular security sensitivity.

In switching from the REE to the TEE, TEE manager 40 authenticates a privileged routine 42 portion of the trusted software, which is desirably stored in a trusted data section 43 of trusted portion 38, enables security-sensitive hardware 44, which is also considered to be located in trusted portion 38, and passes control to privileged routine 42 for it to perform its access on security-sensitive hardware 44. Trusted data section 43 is one of the sections of trusted portion 38 in which data, and particularly the data which constitute privileged routine 42, are stored. Data integrity is assured for data stored in trusted data section 43 by any of a variety of hardware, software, firmware, and/or physical access techniques known to those skilled in the art of providing security for computing devices. In one embodiment, encrypted and authenticated data may have been loaded into trusted data section 43 from the non-trusted portion of computing device 10 and then decrypted and authenticated to cause privileged routine 42 to be located in trusted data section 43. In another embodiment, trusted data section 43 may be configured as a read-only memory (ROM) that was programmed with privileged routine 42 at the time of manufacture and whose contents cannot be altered.

Security-sensitive hardware 44 is disabled when computing device 10 operates in the REE. Security-sensitive hardware 44 is enabled by the activation of a hardware-implemented, privileged-mode signal 46. Security-sensitive hardware 44 is also referred to herein as selectively enabled hardware 44. When privileged-mode signal 46 is activated, computing device 10 is operating in the TEE. As suggested by a connector 48, which may represent either a physical or logical connection, privileged routine 42 is then executed by processor 30. When executed, privileged routine 42 accesses the now enabled selectively-enabled hardware 44 to perform a security-sensitive function for computing device 10.

Security-sensitive hardware 44 may perform any security-sensitive functions known to those skilled in the art. For example, cryptographic circuits that store cryptographic keys may be treated as security-sensitive hardware. Thus, cryptographic functions using these keys, such as encryption and decryption, cannot be carried out in computing device 10 when privileged-mode signal 46 is inactive and computing device 10 operates in the REE, but can be carried out in computing device 10 when privileged-mode signal 46 is active and computing device 10 operates in the TEE. Or, areas of memory located in trusted data section 43 may be disabled from write access, both read and write access, and/or instruction-fetch access when computing device 10 operates in the REE so that sensitive data may be protected, but accessible when computing device 10 operates in the TEE. Or, in an RF transmitter application, a transmitter's operation may be blocked and/or otherwise have operational parameters protected when computing device 10 operates in the REE so that improper transmissions cannot emanate from computing device 10. One or more of these and/or other security-sensitive functions are intended to be included within and performed by security-sensitive hardware 44.

TEE manager 40 couples to internal bus 28. Internal bus 28 includes address, data, and control signals for CPU core 24, and TEE manager 40 appears as memory available through internal bus 28 from which instructions can be fetched and executed and into which data can be written. Those skilled in the art will appreciate that some CPU cores may distinguish between a memory address space and an input-output (IO) address space. For the purposes of this description, such distinctions are unimportant and all such address spaces are simply referred to as memory.

In a preferred embodiment discussed in more detail below, instructions stored in TEE manager 40 cannot be written, at least while computing device 10 operates in the REE, and cannot be read as data. The signals required of internal bus 28 by TEE manager 40 are basic in nature and provided for CPU cores available from a wide variety of different manufacturers. No signal unique to any specific CPU core is required.

An interface 50 couples to internal bus 28 and to pins 14 of semiconductor device 12. Interface 50 is configured so that at least signals which carry instructions from TEE manager 40 into CPU core 24 are disabled from appearing at pins 14.

In an alternative embodiment (not shown), TEE manager 40 may be located on a different semiconductor device 12 from CPU core 24. In this embodiment, instructions fetched from TEE manager 40 by CPU core 24 are desirably encrypted prior to being transferred through pins on that different semiconductor device and onto the semiconductor device 12 where CPU core 24 resides. After being transferred to the semiconductor device 12 where CPU core 24 resides, such instructions are decrypted prior to execution by processor 30. In neither embodiment do instructions fetched from TEE manager 40 appear at the pins of semiconductor devices 12.

Figure 2:
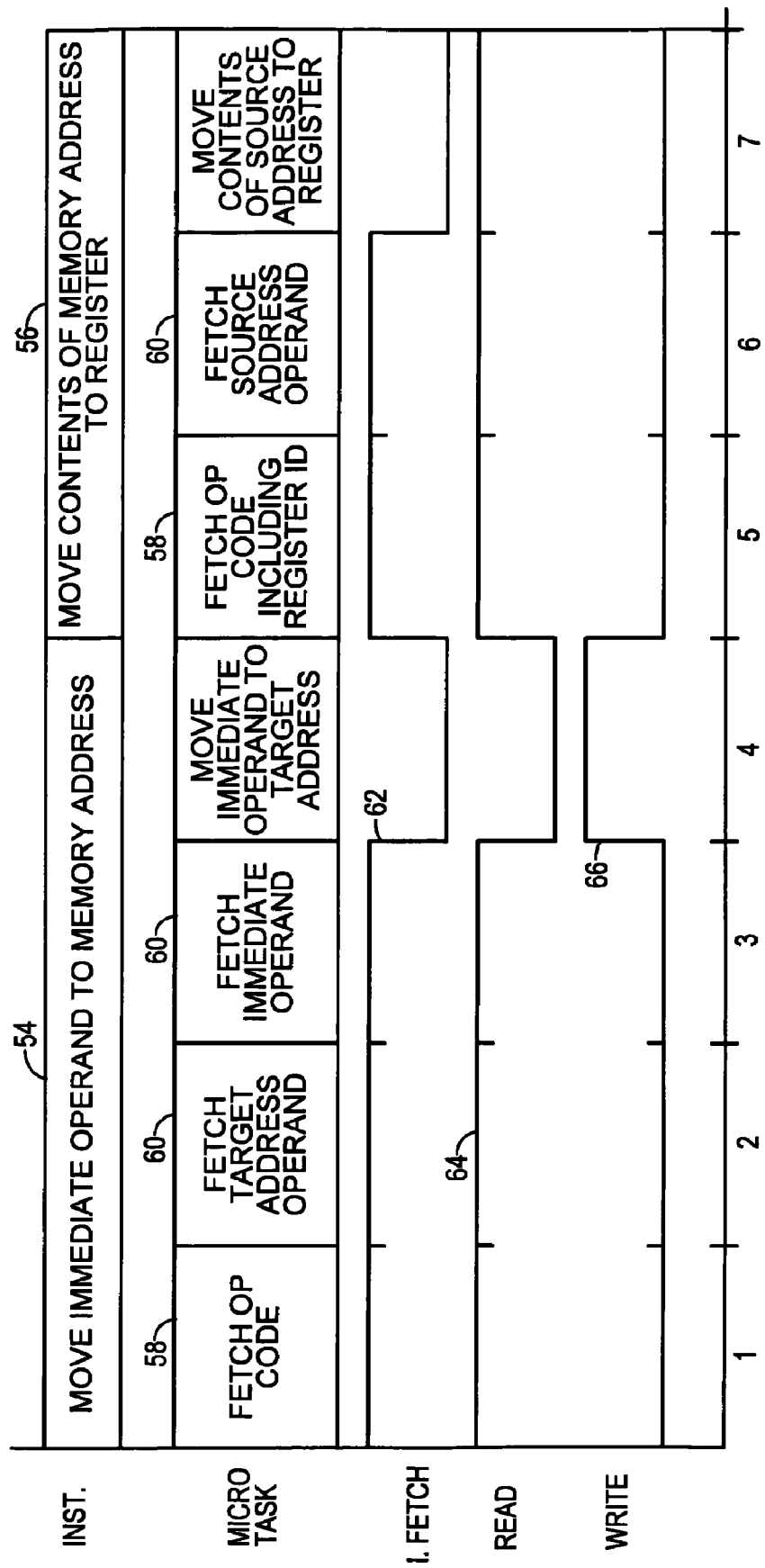
FIG. 2 shows a timing diagram depicting basic tasks and signals commonly available from different varieties of processors which may be used in the computing device depicted in FIG. 1.

FIG. 2 shows a timing diagram depicting tasks and signals commonly available from any of the variety of CPU cores 24 which may be used in computing device 10. In particular, FIG. 2 depicts the execution of two representative instructions by processor 30. FIG. 2 depicts an immediate-operand instruction 54 being fetched and executed first during memory cycles 1-4, followed by a memory-to-register instruction 56 which is fetched and executed in memory cycles 5-7. In particular, FIG. 2 depicts immediate-operand instruction 54 as being an instruction for moving an immediate operand to a memory address and memory-to-register instruction 56 as being an instruction for moving the contents of a memory address to a register. Those skilled in the art will appreciate that an immediate-operand instruction is one in which data to be operated upon are included in the instruction itself and fetched into the CPU core 24 as a part of the instruction. Immediate-operand instructions are commonly accommodated by a wide variety of different CPU's.

Instructions 54 and 56 include operational code (op code) portions 58 and operand portions 60. Op codes 58 are fetched into CPU core 24 during cycles 1 and 5, while operand portions 60 are fetched into CPU core 24 during cycles 2-3 and 6. The particular immediate-operand instruction 54 depicted in FIG. 2 includes two operand portions 60 for instruction 54. One operand portion 60 specifies the "target" memory address where the immediate operand is to be written and the other operand portion 60 specifies the immediate operand itself. Those skilled in the art will appreciate that other immediate-operand instructions may omit the target operand but will still have the immediate operand. FIG. 2 depicts one operand portion 60 for instruction 56 which specifies the address of the memory location from which data are to be moved into a register specified in the instruction's op code.

When an instruction is being fetched into CPU core 24, an instruction fetch (I. Fetch) signal 62 is active. Instruction fetch signal 62 does not remain active throughout all memory cycles. FIG. 2 shows instruction fetches during memory cycles 1-3 and 5-6. An instruction fetch is a type of read operation where the data read are used as instructions to processor 30. From the perspective of CPU core 24, instruction fetches are a different type of memory cycle than data fetches or write operations. After an instruction has been fetched, and when the instruction is actually being executed, as occurs in cycles 4 and 7 in FIG. 2, instruction fetch signal 62 is inactive because no instruction is being fetched in those cycles. Thus, cycle 4 depicts a write cycle where the immediate operand from instruction 54 is written to memory. And, cycle 7 depicts a data fetch or read cycle where data is read from memory and placed in a register. A read signal 64 is active during all instruction fetch cycles, because an instruction fetch is a form—albeit a specialized form—of a read operation, and data fetch cycles (cycle 7). A write signal 66 is active during write cycles. Signals 62, 64, and 66 are part of internal bus 28 (FIG. 1) and generated within CPU core 24.

As discussed in more detail below, TEE manager 40 (FIG. 1) is desirably configured so that data stored therein cannot be accessed, at least while computing device 10 operates in the REE, during any cycle other than an instruction fetch cycle. This enhances security by prohibiting non-trusted software from being able to read the locations in the memory space of CPU core 24 where instructions are stored in TEE manager 40. Such instructions may be transferred into CPU core 24 as instructions but not as data.

Those skilled in the art will appreciate that FIG. 2 is intended to impose no limitation on the manner in which CPU core 24 may operate. For example, processor 30 desirably executes a wide variety of other instructions than are depicted in FIG. 2, and nothing requires processor 30 to be able to execute precisely the instructions depicted in FIG. 2 because other instructions may be used to accomplish the same tasks. Likewise, when CPU core 24 includes caches 32 and 34 (FIG. 1), nothing requires an instruction that has been fetched to actually be executed. This situation may occur, for example, in connection with speculative branching techniques or the activation of interrupts. And, when instructions fetched into CPU core 24 are actually executed, the execution may occur far later than the memory cycles where the instructions were fetched. If CPU core 24 is configured to support separate data and instruction busses, then all memory accesses over the instruction bus are instruction fetches, and an instruction fetch signal may be omitted. Nevertheless, the ability to determine from outside CPU core 24 whether a memory cycle is an instruction cycle or a data fetch cycle is a basic feature of a wide variety of CPU cores which may be used as CPU core 24.

Figure 3:
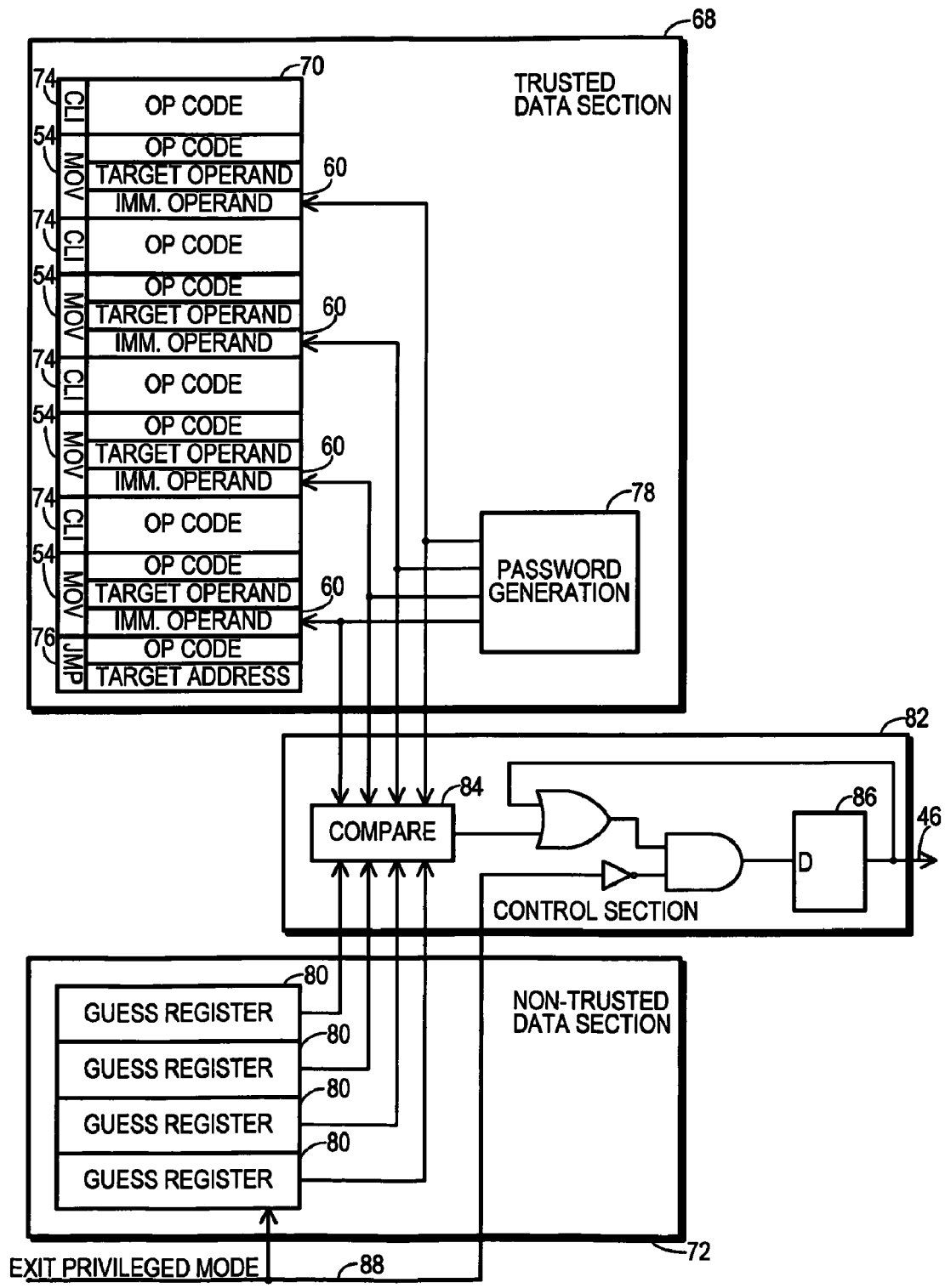
FIG. 3 shows a high-level block diagram of a trusted execution environment (TEE) manager portion of the computing device depicted in FIG. 1.

FIG. 3 shows a high-level block diagram of TEE manager 40 from computing device 10. FIG. 3 depicts how TEE manager 40 is configured to verify that instructions fetched from TEE manager 40, and not duplicates, copies or otherwise similar instructions located elsewhere in the memory space of processor 30, are actually executed by CPU core 24. The actual execution of the fetched instructions authenticates the trusted software of privileged routine 42 because only the trusted software of privileged routine 42 contains the correct authentication password, and the only way to present the password for validation by the TEE Manager 40 is to actually execute the sequence of instructions that contains the password.

TEE manager 40 includes a trusted data section 68 where instructions in the form of an authentication routine 70 are stored and a non-trusted data section 72 where data are written. Data integrity is assured for trusted data section 68 by any of a variety of hardware, software, and firmware techniques known to those skilled in the art of computer security. To a desired degree of confidence, the instructions stored in trusted data section 68 remain sound, unimpaired, and unmolested. Those skilled in the art will appreciate that no specific physical location is required of trusted data section 68 so long as data integrity is assured. The instructions may be fetched as instructions when computing device 10 operates in the REE, but may not be altered by any software executing on processor 30 while computing device 10 operates in the REE. As discussed above, the instructions may not be read as data but, desirably, only fetched as instructions.

Data may be written into non-trusted data section 72 at any time, including when computing device 10 operates in the REE. Thus, non-trusted software is free to write data into non-trusted data section 72 and to overwrite data previously written therein. Data written into non-trusted data section 72 may or may not be readable by processor 30. If such data are readable by processor 30, nothing need restrict such data from being readable during operation in the non-privileged mode of operation.

Trusted data section 68 appears to processor 30 as a section of memory in which authentication routine 70 is stored. FIG. 3 depicts the authentication routine 70 as being four instruction pairs, with each pair including an instruction to inhibit interrupts 74 (CLI—"clear interrupts"), followed by an immediate-to-memory, immediate-operand (MOV) instruction 54. A jump (JMP) instruction 76 follows the four sets of instruction pairs.

Non-trusted software, including malicious software, is free to transfer program control to any instruction in authentication routine 70. But in order for computing device 10 to switch from the REE to the TEE, such execution should be directed to the first instruction of authentication routine 70. Program execution will then sequence through the remaining instructions of authentication routine 70 before the TEE manager switches from the REE to the TEE.

The inhibit interrupts instructions 74 are configured to secure interrupts so that either no interrupts will be recognized until enabled or to control all recognizable interrupt jump vectors to point into trusted software. Instructions 74 are interspersed among the immediate-operand instructions 54 so that if program flow somehow misses execution of the first inhibit interrupt instruction 74, it will nevertheless execute one of the instructions 74 before executing all of the immediate-operand instructions 54.

FIG. 3 shows that trusted data section 68 is associated with a password generation section 78. In the preferred embodiment, immediate-operand instructions 54 are each configured as password-bearing, immediate-operand instructions. In particular, the immediate-operand portions 60 of immediate-operand instructions 54 convey passwords supplied by password generation section 78. Thus, when processor 30 executes immediate-operand instructions 54, the passwords are treated by processor 30 as the immediate-operand portions 60 of the instructions. In the case of the immediate-to-memory instruction depicted in FIG. 3, the target-operand portions of the instructions cause the password to be written into memory addresses associated with guess registers 80 in non-trusted data section 72. Thus, by actually executing the password-bearing, immediate-operand instructions 54, the passwords are written into guess registers 80.

A variety of different techniques may be used by password generation section 78, and password generation section 78 need not be implemented through the use of hardware. In different embodiments, password generation section 78 may be implemented through software, through the use of a random number generator, or through data supplied from outside computing device 10 during the manufacture of semiconductor device 12 (FIG. 1).

A control section 82 is configured to identify when a predetermined relationship exists between the password guesses in guess registers 80 and the password-bearing, immediate-operand instructions 54, and to signal the privileged mode (TEE) in response to identifying the predetermined relationship. In the version of control section 82 depicted in FIG. 3, the predetermined relationship being identified is equivalence between the immediate-operand portions 60 of instructions 54 and the guesses in guess registers 80. Thus, all passwords and guesses are fed to a comparator 84. Comparator 84 signals when the guesses match the passwords, and an output of comparator 84 is fed to a logic circuit that includes a latch 86 for indicating whether computing device 10 is operating in the non-privileged mode (REE) or privileged mode (TEE). The output of latch 86 supplies privileged-mode signal 46, discussed above in connection with FIG. 1. The logic circuit is configured so that once latch 86 indicates operation in the TEE by virtue of comparator 84 signaling a match between all passwords and guesses, it continues to indicate operation in the TEE, until an exit-privileged-mode signal 88 is activated to clear all guess registers 80 and reset latch 86, thereby indicating operation in the REE.

After executing all password-bearing, immediate-operand instructions 54 and any corresponding instructions which write data to non-trusted data section 72, program control causes the execution of jump instruction 76. Jump instruction 76 is configured to cause program control to exit authentication routine 70 and execute an entry instruction for privileged routine 42 (FIG. 1). Of course, nothing requires jump instruction 76 to be included in authentication routine 70. As an alternative, privileged routine 42 may be placed immediately after authentication routine 70 in the memory space for processor 30, and program control will exit authentication routine 70 and then execute the first instruction of privileged routine 42 without requiring a jump instruction.

A plurality of password-bearing, immediate-operand instructions 54 are provided and verified by TEE manager 40 in the preferred embodiment for two reasons. The combined password made from all passwords taken together is much more immune to attack or accidental guessing than a single password would be. And, a potential exotic attack that attempted to coordinate interrupts with the caching of instructions might possibly lead to fetching and caching, but not executing, a single password, which could then be read from the cache. But only a portion of the combined password would be discovered in this manner, and discovery of the entire combined password would still be exceedingly unlikely.

In a preferred embodiment, password generation section 78 is configured so that the passwords change from time to time. Accordingly, the likelihood of a systematic attack that repeatedly writes guesses into guess registers 80 and tests for entry into the TEE is exceedingly unlikely to be successful.

Those skilled in the art will appreciate that many variations may be made in the theme generally presented by FIG. 3. For example, a single password might be used in lieu of the plurality of passwords discussed above. If a plurality of passwords is used, the precise number may be determined to achieve a desired tradeoff between implementation complexity and a desired amount of security. But the use of precisely four passwords as depicted in FIG. 3 is no requirement.

In an alternate embodiment, passwords are not required to change from time to time. In this embodiment, a combined password having a greater number of bits might be desirable, and/or other techniques for reducing the likelihood of success in a systematic attack may be employed. Such other techniques may include limiting the frequency of permitted guesses, restricting the number of incorrect guesses that will be tolerated, and the like. Moreover, in this embodiment, it would be desirable for the manufacturer of computing device 10 to insure that no two computing devices 10 have the same password.

Authentication routine 70 desirably includes an instruction which writes data to non-trusted data section 72, as discussed above in connection with an immediate-to-memory, immediate-operand instruction 54. But this particular type of instruction is not a requirement. In an alternate embodiment, the immediate-operand portion 60 of each immediate-operand instruction 54 may be placed in a register then written to a guess register 80 in a separate register-to-memory instruction. And, nothing requires the exact same password fetched with an immediate-operand instruction 54 to be written into a guess register 80. In another alternate embodiment, other instructions may cause the password to be altered, with the altered password being written into a guess register 80. In this embodiment, hardware within TEE manager 40 would desirably perform a similar alteration or otherwise cause control section 82 to identify a relationship between passwords and guesses that is not equivalence.

Figure 4:
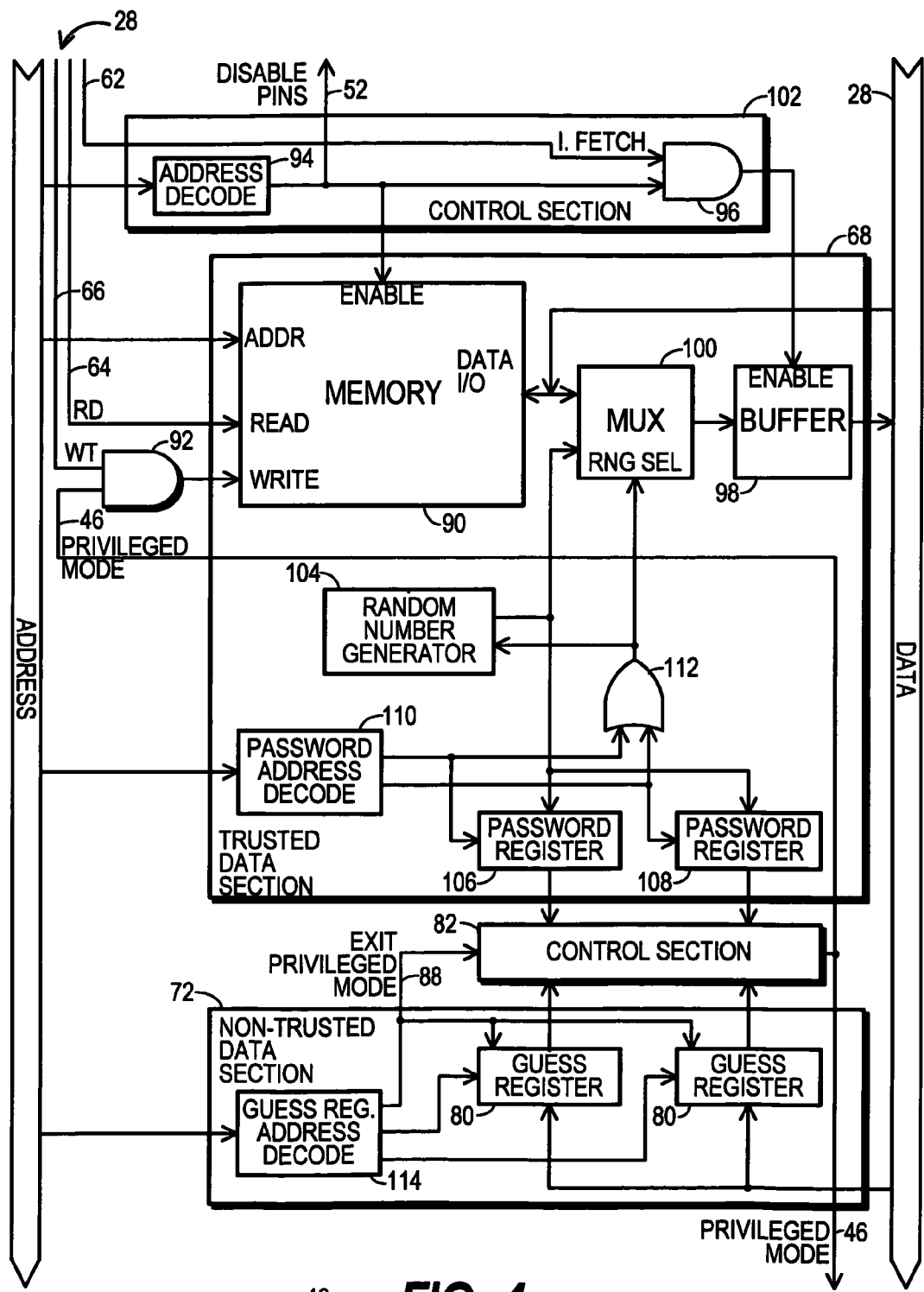
FIG. 4 shows a more detailed block diagram of a first embodiment of the TEE manager of FIG. 3.

FIG. 4 shows a more detailed block diagram of a first embodiment of TEE manager 40. The block diagram of FIG. 4 depicts one way to implement the theme generally presented in FIG. 3.

Trusted data section 68 includes a memory 90 that couples to internal bus 28.

Memory 90 stores authentication routine 70 (FIG. 3). A portion, typically but not necessarily a few of the least significant bits, of address signals from bus 28 couples to an address input of memory 90, and data signals from bus 28 couple to a data I/O port of memory 90. Read signal 64 from bus 28 couples to a read input of memory 90, and write signal 66 is gated with privileged-mode signal 46 in a gate 92. An output of gate 92 couples to a write input of memory 90. Gate 92 provides an AND function so that write access to trusted data section 68 and its memory 90 is denied while computing device 10 operates in its non-privileged mode (the REE). Gate 92 also prevents processor 30 from overwriting immediate-operand instructions 54 when selectively enabled hardware 44 (FIG. 1) is disabled, as signaled by privileged-mode signal 46.

Another portion of address signals from bus 28, typically but not necessarily more significant bits than are routed to address inputs of memory 90, couples to an address decode section 94. Address decode section 94 is desirably configured to identify when a memory cycle is being addressed to TEE manager 40. An output of address decode section 94 couples to an enable input of memory 90 and also serves as disable-pins signal 52, discussed above in connection with FIG. 1. When a memory cycle is addressed to TEE manager 40, memory 90 is enabled and may be accessed, provided other conditions are met. But when a memory cycle is addressed to TEE manager 40, interface 50 of semiconductor device 12 is disabled so that signals appearing on internal bus 28 do not pass through pins 14 where they might possibly be detectable from outside semiconductor 12.

The output from address decode section 94 and instruction fetch (I. FETCH) signal 62 from internal bus 28 couple to inputs of a gate 96 configured to provide an AND function. An output of gate 96 couples to an enable input of a buffer 98.

The data I/O port of memory 90 also couples to a first data input of a multiplexer (MUX) 100, and a data output of multiplexer 100 couples to an input of buffer 98. An output section of buffer 98, when enabled, drives the data signals of internal bus 28.

Together, address decode section 94 and gate 96 form a control section 102. Control section 102 is configured to grant read access to password-bearing, immediate-operand instructions 54 (FIG. 3) in response to an instruction fetch memory cycle addressed to trusted data section 68 of TEE manager 40, but to deny read access to password-bearing, immediate-operand instructions 54 in response to data fetch memory cycles. During such instruction fetch memory cycles, instructions, including password-bearing, immediate-operand instructions 54, are read from memory 90 and passed through multiplexer 100 and buffer 98 to drive the data signals of internal bus 28. These data signals are routed to the instruction path for processor 30. Those skilled in the art will appreciate that in some architectures data and instructions have separate bus paths within internal bus 28. In such architectures, the output of buffer 98 couples to the path for instructions, not data.

TEE manager 40 includes a random number generator 104. Desirably, random number generator 104 is configured so that software, and particularly non-trusted software, executed by processor 30 has no influence over the random numbers produced by random number generator. An output of random number generator 104 couples to a second data input of multiplexer 100 as well as to inputs of password registers 106 and 108. Unlike the embodiment depicted in FIG. 3 which utilized four passwords, the embodiment of FIG. 4 utilizes only two passwords. Those skilled in the art will appreciate that the FIG. 4 embodiment could alternatively utilize only a single password or a greater number of passwords, and that the number of password registers would be adjusted accordingly.

A password address decode section 110 has an input which couples to address signals from internal bus 28. Password address decode section 110 is configured to identify when memory cycles are addressed to the specific memory locations where immediate operands 60 (FIG. 3) of password-bearing, immediate-operand instructions 54 reside. One output is provided from address decode section 110 for each such instruction 54. The outputs couple to respective inputs of a gate 112. Gate 112 is configured to provide an OR function, and an output of gate 112 couples to a selection input of multiplexer 100. Accordingly, when any memory access cycle is addressed to an immediate operand 60 of any password-bearing, immediate-operand instruction 54 included in authentication routine 70, multiplexer 100 routes a random number from random number generator 104 to buffer 98. This random number, rather than the actual data stored in memory 90, drives the appropriate data signals of internal bus 28 during an instruction fetch memory cycle so that the random number is fetched as the immediate operand. In addition, the random number that drives the data signals is latched into the corresponding password register 106 or 108.

An output from gate 112 also couples to a control input of random number generator 104 to control the generation of random numbers. In this embodiment, each access to a password-bearing, immediate-operand instruction 54 causes a new random number to be generated. As a consequence, the password portions of immediate-operand instructions 54 are altered from time to time. More particularly, a password portion is altered at each access attempt. As discussed above, the altering of passwords from time to time is desirable because it makes a systematic attack having discovery of the passwords as an objective exceedingly unlikely to prove successful.

Non-trusted data section 72 includes a guess register address decode section 114 configured to identify when memory cycles are addressed to the specific memory locations where guesses registers 80 reside. One output is provided from address decode section 114 for each guess register 80, and couples to a control or clock input of the respective guess register 80. Inputs to guess register 80 are driven by data signals from internal bus 28, and outputs of guess registers 80 couple to inputs of control section 82. Thus, guesses are written to respective guess registers 80 when processor 30 executes instructions having memory write cycles addressed to the guess registers 80.

Outputs of password registers 106 and 108 likewise couple to control section 82. Control section 82 may be configured as discussed above in connection with FIG. 3. Thus, control section 82 verifies the existence of a predetermined relationship between passwords from trusted data section 68 and guesses from non-trusted data section 72 and activates privileged-mode signal 46 when the predetermined relationship is identified.

Desirably, privileged routine 42 is configured so that it includes a command which causes computing device 10 to switch back to the REE. Desirably, such a command is issued immediately prior to exiting privileged routine 42. That command may be implemented as an instruction that includes a memory access addressed to a dummy guess register whose address is decoded by guess register address decoder 114. The dummy guess register need not exist in hardware. But decoder 114 may include an output for that dummy guess register that activates exit-privileged-mode signal 88, clears all other guess registers 80, and toggles control section 82 into signaling the non-privileged mode of operation through the deactivation of privileged-mode signal 46.

Figure 5:
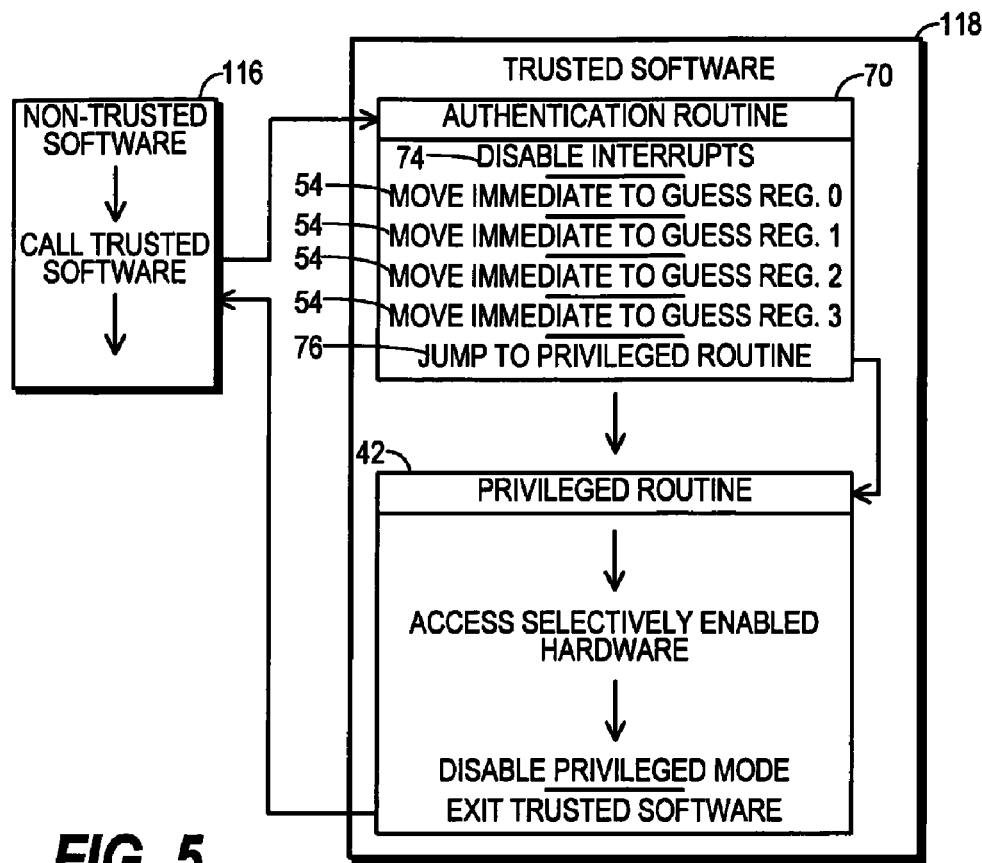
FIG. 5 shows interaction between non-trusted and trusted software in the computing device depicted in FIG. 1.

FIG. 5 shows interaction between non-trusted and trusted software in computing device 10. In particular, during the normal operation of computing device 10 processor 30 occasionally executes non-trusted software 116 and occasionally executes trusted software 118. As mentioned above, trusted software 118 includes authentication routine 70 and privileged routine 42.

Non-trusted software 116 may perform any manner of function or functions, including malicious functions. Non-trusted software 116 executes in the REE, or non-privileged mode in which selectively enabled, security-sensitive hardware 44 (FIG. 1) is disabled. Consequently, no harm results from the execution of non-trusted software 116.

In accordance with the normal functioning of computing device 10, non-trusted software 116 includes an instruction which essentially initiates the execution of trusted software 118. Before executing privileged routine 42, authentication routine 70 is executed to authenticate privileged routine 42. In other words, the execution of authentication routine 70 insures that privileged routine 42 truly is trusted software. As discussed above, authentication routine 70 executes immediate-operand instructions 54 to cause passwords to be fetched into CPU core 24 as instructions and not as data, and executes instructions which write the immediate operands to guess registers 80 to prove that the immediate-operand instructions 54 were actually executed and not just fetched. The embodiments disclosed above discuss the use of a particular immediate-operand instruction 54 that writes its immediate operand to a guess register 80, but the use of this specific instruction is not required. The immediate-operand instruction 54 might simply fetch the immediate operand 60 into a register and another instruction can then write the contents of the register to the guess register 80. When the guess register 80 contents exhibit the predetermined relationship with the immediate-operand instructions 54, privileged-mode signal 46 is activated, signaling operation of computing device 10 in the TEE, or privileged mode. While in the privileged mode, selectively enabled, security-sensitive hardware 44 (FIG. 1) is enabled.

Program control exits from authentication routine 70 to privileged routine 42. Privileged routine 42 may perform any of a number of functions that have a security-sensitive component to them. To the extent that dedicated hardware, such as cryptographic circuits, memory, transmitter controls, or the like, is required to carry out these functions, such hardware is now enabled, and instructions within privileged routine 42 successfully access the selectively enabled hardware 44. Eventually, the function or functions provided by privileged routine 42 have been performed, and program control exits privileged routine 42. But before leaving, the privileged mode of operation is disabled by executing an appropriate instruction, such as the above-discussed instruction that includes a memory access addressed to a dummy guess register whose address is decoded by guess register address decoder 114 (FIG. 4). Following this instruction, privileged-mode signal 46 is inactive, security-sensitive hardware 44 disabled, and program control exits privileged routine 42 back to non-trusted software 116.

Referring back to FIG. 4, the use of random number generator 104 to generate passwords is a preferred embodiment because the human element is removed from password generation and passwords are conveniently altered from time to time in response to data from random number generator 104. No person or machine, not even associated with the manufacturer of semiconductor device 12, is able to predict the value of any password with more likelihood of success than a random guess. Moreover, random number generators are often available in integrated circuits which perform cryptographic functions, as may be the case for semiconductor device 12, and may be included in TEE manager 40 at little additional cost. Nevertheless, the use of a random number generator in TEE manager 40 is not a requirement.

Figure 6:
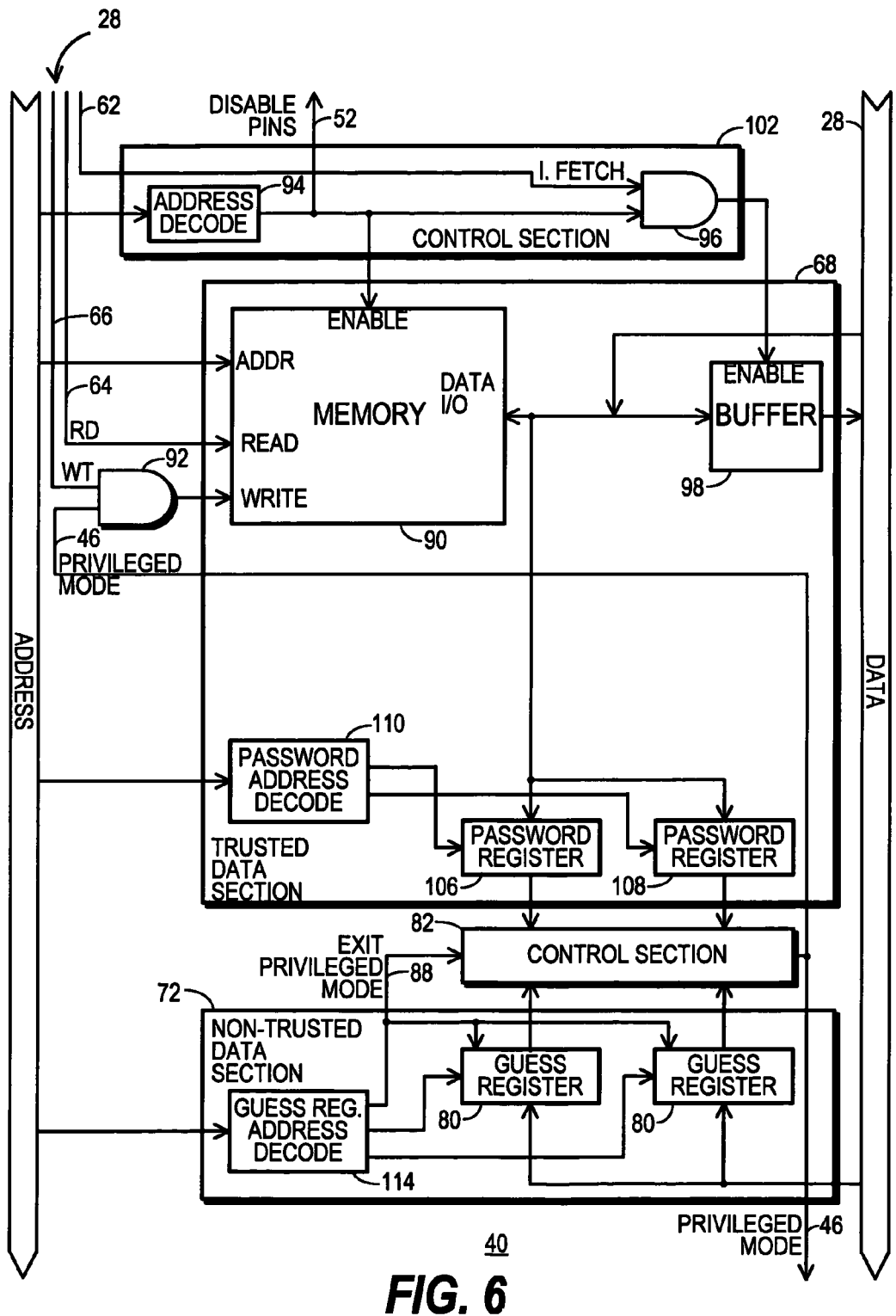
FIG. 6 shows a more detailed block diagram of a second embodiment of the TEE manager of FIG. 3.

FIG. 6 shows a more detailed block diagram of a second embodiment of TEE manager 40. The second embodiment of FIG. 6 differs from the first embodiment of FIG. 4 in that random number generator 104 and associated circuits are omitted. Rather than use a hardware-implemented random number generator, the embodiment of FIG. 6 uses passwords stored in memory 90 as the operand portions 60 (FIG. 2) of password-bearing, immediate-operand instructions 54 of authentication routine 70. Desirably, instructions in privileged routine 42 are configured to alter these operand portions 60 from time to time. Thus, when password addresses are decoded by password address decode section 110, the data fetched from memory 90 for that address is latched in password register 106 or 108 as it is fetched into processor 30 as an instruction. The contents of password registers 106 and 108 are compared in control section 82 with the contents of guess registers 80, and when a predetermined relationship, such as equivalence, is detected, privileged-mode signal 46 is activated.

Figure 7:
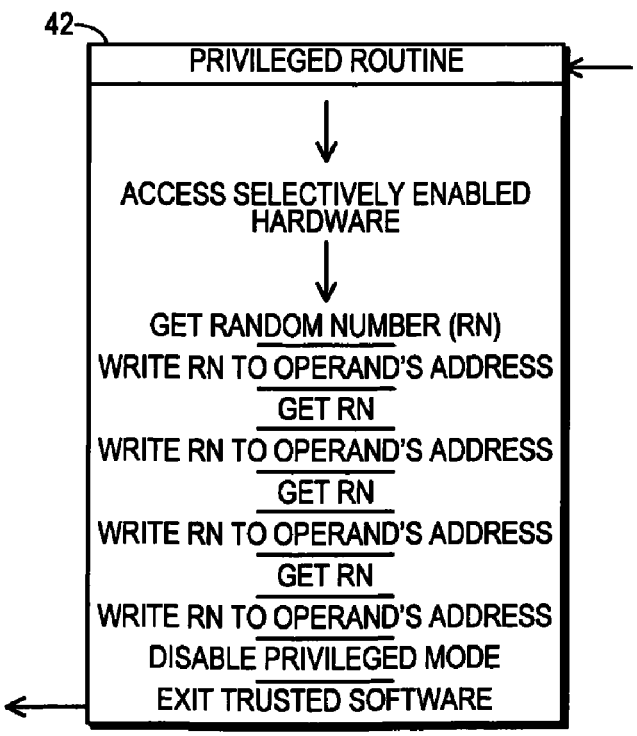
FIG. 7 shows an alternate embodiment of a privileged routine portion of the trusted software depicted in FIG. 5.

FIG. 7 shows an alternate embodiment of privileged routine 42 from that depicted in FIG. 5. As with the FIG. 5 embodiment of privileged routine 42, privileged routine 42 may perform any of a number of functions that have a security-sensitive component to them. To the extent that dedicated hardware, such as cryptographic circuits, memory, transmitter controls, or the like, is required to carry out these functions, such hardware is enabled by the time privileged routine 42 is entered, and instructions within privileged routine 42 access the selectively enabled hardware 44. Eventually, the function or functions provided by privileged routine 42 have been performed, and program control exits privileged routine 42.

But before leaving, the passwords provided by immediate operands 60 in password-bearing, immediate-operand instructions 54 are desirably altered. The logic provided by gate 92 (FIG. 6) permits data to be written into memory 90 while computing device 10 operates in the privileged mode. Thus, prior to exiting privileged routine 42, privileged routine 42 desirably executes instructions to get a random number (RN) and write the random number into a corresponding address for the immediate operand 60 of the password-bearing, immediate operand instructions stored in memory 90. Desirably, such password-altering instructions are repeated for each separate password-bearing, immediate-operand instruction 54 included in authentication routine 70. The random numbers may be obtained in a manner known to those skilled in the art, including through the use of software-implemented random number generators, which are preferably implemented using trusted software. Since trusted software is used to perform the password alteration function, security assurances are maintained.

After executing the password-altering instructions, the privileged mode of operation is disabled by executing an appropriate instruction, such as the above-discussed instruction that includes a memory access addressed to a dummy guess register whose address is decoded by guess register address decoder 114 (FIG. 4). Following this instruction, privileged-mode signal 46 is inactive, security-sensitive hardware 44 disabled, and program control exits privileged routine 42 back to non-trusted software 116.

In summary, at least one embodiment of the present invention provides an improved computing device and method with entry authentication into a trusted execution environment (TEE). In at least one embodiment of the present invention a TEE manager manages a TEE for an entire system without relying on specific signals or features unique to any CPU core or operating system. In at least one embodiment of the present invention a TEE manager relies on basic features endemic to most all CPU cores and avoids operating system specific features to implement a system wide security policy that accommodates a TEE. In at least one embodiment of the present invention, a TEE manager is configured in a low overhead manner wherein relatively few gates and little processing time are required to enforce effective system-wide security policies. In at least one embodiment of the present invention, a TEE manager manages system-wide security policies for a computing device that includes any number of independent active entities, such as multiple CPU's, operating systems, DMA controllers, and the like. And, in at least one embodiment of the present invention, a TEE is provided in a manner that allows it to work in addition to and be compatible with existing supervisory or privileged modes that may be implemented in a CPU core or operating system.

Although the preferred embodiments of the invention have been illustrated and described in detail, it will be readily apparent to those skilled in the art that various modifications and extensions may be made therein without departing from the spirit of the invention or from the scope of the appended claims. For example, it may be desirable for computing device 10 to boot-up into its privileged mode so that trusted bootstrap programs may then be permitted to load trusted data and/or instructions into trusted data sections. And, while the above-presented discussion mentions only a single privileged routine, computing device 10 may be configured to have any number of independent privileged routines. In this scenario, each privileged routine may be associated with its own authentication routine, or a common authentication routine may switch program control to an appropriate privileged routine after authentication of trusted software has been assured. These and other modifications and extensions are intended to be included within the scope of the present invention.

What is claimed is:

1. A computing device which selectively operates in a non-privileged mode and a privileged mode, said computing device comprising:
   a trusted data section configured to store an authentication routine which includes a plurality of immediate-operand instructions wherein each of said plurality of immediate operand instructions has an operand configured to convey a portion of a password;
   a first control section configured to grant read access to said immediate-operand instruction in response to an instruction fetch addressed to said trusted data section;
   a non-trusted data section configured to store a password guess; and
   a second control section, configured as a physical circuit, coupled to said trusted and non-trusted data sections and configured to identify when a predetermined relationship exists between all of said plurality of immediate-operand instructions and said password guess and to signal said privileged mode of operation in response to identifying said predetermined relationship.

2. The computing device as claimed in claim 1 wherein write access is denied for said trusted data section while said computing device operates in said non-privileged mode.

3. The computing device as claimed in claim 1 wherein: said trusted data section is configured so that said operands of said plurality of immediate-operand instructions are altered from time to time.

4. The computing device as claimed in claim 3 wherein said operands of said plurality of immediate-operand instructions are altered at least as often as said computing device operates in said privileged mode.

5. The computing device as claimed in claim 3 wherein:
   said first control section includes a random number generator; and
   said is operands of said plurality of immediate-operand instructions are altered in response to data generated by said random number generator.

6. The computing device as claimed in claim 1 wherein said plurality of immediate-operand instructions are prevented from being overwritten when said computing device operates in said non-privileged mode.

7. The computing device as claimed in claim 1 wherein said first control section is configured to deny read access to said plurality of immediate-operand instructions in response to a data fetch.

8. A computing device which selectively operates in a non-privileged mode and a privileged mode, said computing device comprising:
a processor;
a trusted execution environment manager having:
    a first trusted data section configured to store an authentication routine which is executable by said processor and includes an immediate-operand instruction;
    a first control section configured to grant read access to said immediate-operand instruction in response to an instruction fetch access addressed to said first trusted data section;
    a non-trusted data section configured to store a password guess; and
    a second control section coupled to said first trusted data section and to said non-trusted data section and configured to identify when a predetermined relationship exists between said immediate-operand instruction and said password guess and to signal said privileged mode of operation in response to identifying said predetermined relationship;
selectively enabled hardware coupled to said trusted execution environment manager, said selectively enabled hardware being enabled when said privileged mode is signaled and being disabled when said non-privileged mode is signaled; and
a second trusted data section configured to store a privileged routine which is executable by said processor, wherein said authentication routine exits to said privileged routine, said privileged routine is configured to access said selectively enabled hardware, and said privileged routine is configured to instruct said trusted execution environment manager to signal said non-privileged mode of operation prior to exiting.

9. A method of authenticating entry into a trusted environment of a computing device which has a processor and a hardware trusted execution environment manager and which selectively operates in a non-privileged mode and a privileged mode, said method comprising:
    storing an authentication routine in a first trusted data section of said hardware trusted execution environment manager, said authentication routine being executable by said processor, said authentication routine including an immediate-operand instruction, and said authentication routine being configured to exit to a privileged routine;
    granting, in a first control section of said hardware trusted execution environment manager, read access to said immediate-operand instruction in response to an instruction fetch access addressed by said processor to said first trusted data section;
    storing a password guess in a non-trusted data section of said hardware trusted execution environment manager;
    identifying, in a second control section of said hardware trusted execution environment manager, when a predetermined relationship exists between said immediate-operand instruction and said password guess;
    signaling said privileged mode of operation in response to said identifying step;
    enabling selectively enabled hardware coupled to said trusted execution environment manager when said privileged mode is signaled in response to said identifying step;
    disabling said selectively enabled hardware when said non-privileged mode is signaled in response to said identifying step; and
    storing said privileged routine in a second trusted data section, said privileged routine being executable by said processor, said privileged routine being configured to access said selectively enabled hardware, and said privileged routine being configured to instruct said trusted execution environment manager to signal said non-privileged mode of operation prior to exiting.

10. The method claimed in claim 9 wherein said computing device is formed using one or more semiconductor devices which have pins through which signals are routed into and out from said semiconductor devices and said method additionally comprises:
    refraining from transferring said immediate-operand instruction through one or more of said pins of a semiconductor device of said one or more semiconductor devices.

11. The method claimed in claim 9 wherein said authentication routine includes an instruction which is executed by said processor to implement said step of storing said password guess in said non-trusted data section.

12. The method claimed in claim 11 wherein:
said authentication routine includes a plurality of immediate-operand instructions wherein each of said plurality of immediate operand instructions has an operand configured to convey a portion of a password;
said step of storing said password guess in said non-trusted data section is implemented by said processor executing all of said plurality of immediate operand instructions.

13. The method claimed in claim 9 wherein:
said immediate-operand instruction includes an operation code portion and an operand portion; and
said method additionally comprises altering said operand portion of said immediate-operand instruction from time to time.

14. The method claimed in claim 13 wherein said operand portion of said immediate-operand instruction is altered at least as often as said privileged routine is executed.

15. The method claimed in claim 13 wherein said operand portion of said immediate-operand instruction is altered in response to data provided by a random number generator.

16. The method claimed in claim 9 wherein:
said immediate-operand instruction includes an operation code portion and an operand portion; and
said privileged routine is configured to alter said operand portion of said immediate-operand instruction.

17. The method claimed in claim 9 wherein: said processor is prevented from overwriting said immediate-operand instruction when said selectively enabled hardware is disabled.

* * * * *